United States Patent Office 2,958,550
Patented Nov. 1, 1960

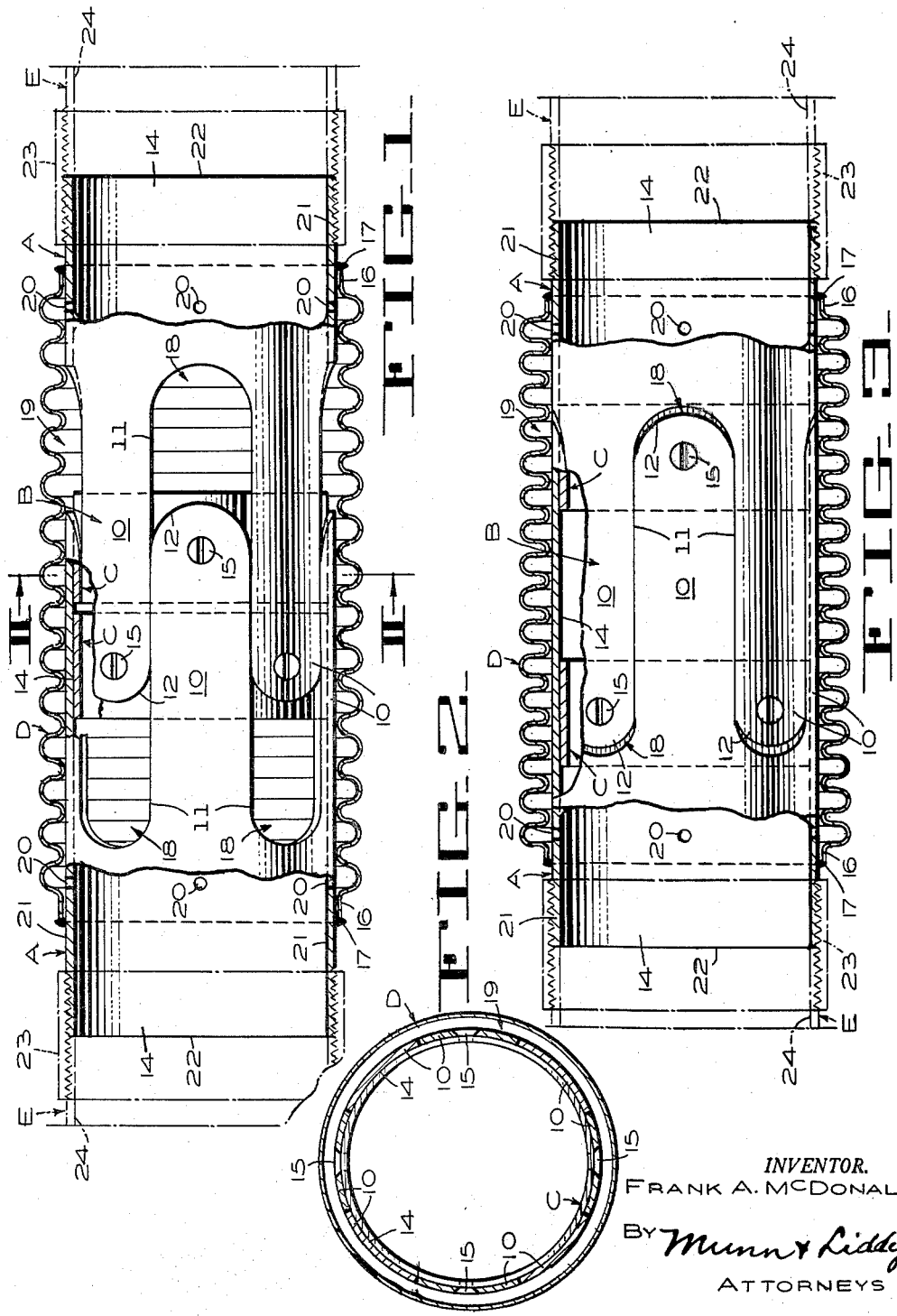

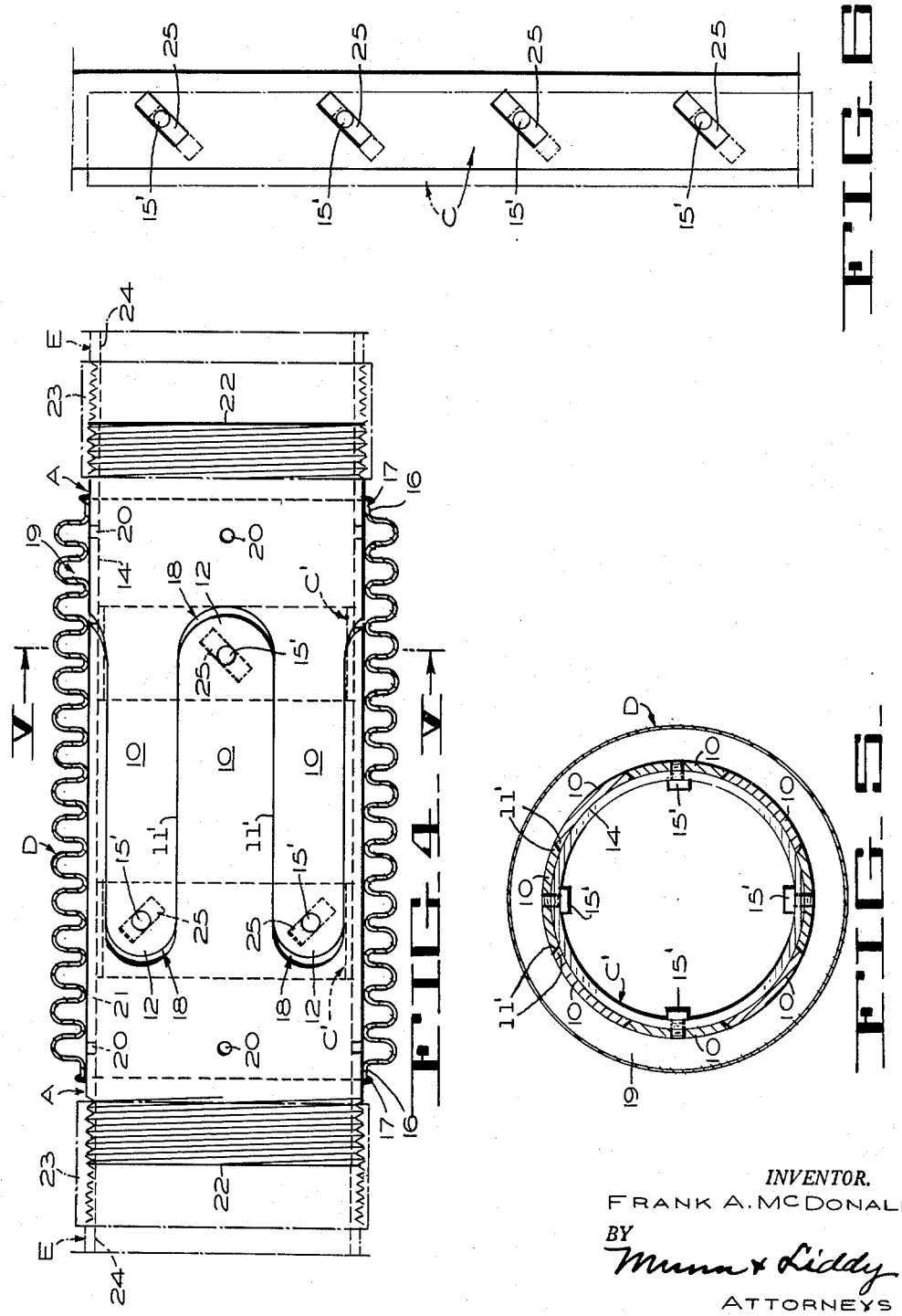

2,958,550

BELLOWS-TYPE EXPANSION COMPENSATOR WITH ANTI-TORQUE GUIDE

Frank A. McDonald, 63 Main St., San Francisco, Calif.

Filed Apr. 17, 1958, Ser. No. 729,139

3 Claims. (Cl. 285—301)

The present invention relates to improvements in a bellows-type expansion compensator with anti-torque guide. It consists of the combinations, constructions, and arrangement of parts, as hereinafter described and claimed.

As the cardinal object of my invention, it is proposed to provide an expansion compensator, which includes a flexible metallic tubular bellows, and having a guide disposed to hold the bellows against squirming during expansion and contraction of the compensator. Moreover, the guide is arranged in such a manner that the bellows will be relieved of any torque, and thus the bellows will not be ruptured.

More specifically stated, it is proposed to provide a pair of pipe sections which are arranged in axial alignment with one another, each being fashioned with guide fingers, the fingers of one pipe section being arranged in interdigitating and sliding relation with the fingers of the other pipe section. Also, a pair of guide rings are provided, one ring being secured to the fingers of each of the pipe sections, and being arranged for holding the pipe sections from cocking or swinging into angular relation with respect to one another. Thus the fingers and guide rings serve to hold the pipe sections in axial alignment relative to one another as the pipe sections are moved toward and away from each other. The bellows enclose the expansion joint area defined by the fingers and prevent escape of fluid from the line into which the expansion compensator is coupled.

Other objects and advantages will appear as the specification proceeds. The novel features will be pointed out in the claims appended hereunto.

Drawings

For a better understanding of my invention, reference should be had to the accompanying drawings, forming part of this specification, in which:

Figure 1 is a longitudinal sectional view of my bellows-type expansion compensator with anti-torque guide, parts being shown in elevation, and the pair of pipe sections being moved away from one another;

Figure 2 is a transverse sectional view taken along the plane II—II of Figure 1;

Figure 3 is a view similar to Figure 1, but with the pipe sections being moved toward one another;

Figure 4 is a longitudinal sectional view taken through a modified form of my bellows-type expansion compensator with anti-torque guide, with parts being shown in elevation, and illustrating means for adjusting the guide rings axially relatively to one another;

Figure 5 is a transverse sectional view taken along the plane V—V of Figure 4; and Figure 6 is a development view of one of the guide rings.

While I have shown only the preferred forms of my invention, it should be understood that various changes, or modifications may be made within the scope of the appended claims without departing from the spirit thereof.

Detailed description

Referring now to the drawings in detail, I provide a pair of pipe sections which are designated generally at A and arranged in axial alignment with one another. Each of these pipe sections is fashioned with a plurality of longitudinally extending fingers 10 which are spaced circumferentially from one another. The fingers of each pipe section A are arranged in interdigitating relation with the fingers of the other pipe section A, as clearly shown in the drawing. Thus the pipe sections A are movable toward and away from each other to thereby provide an expansion joint area which is designated generally at B.

As shown in Figures 1 and 3 of the drawing, each finger 10 defines parallel side walls 11, and the tips of the fingers are rounded, as at 12. The fingers of one pipe section are arranged in sliding contact with the fingers of the other pipe section, whereby the pipe sections A are precluded from rotating circumferentially relative to one another as the pipe sections are moved toward and away from each other.

It will be noted that each pipe section A defines a bore 14 extending lengthwise thereof and including the fingers 10. As disclosed in Figure 2, these bores are cylindrical. Moreover, a pair of guide rings C are provided, each being secured to the tip portions of the fingers 10 of one of the pipe sections A by any suitable means, such as countersunk set-screws 15. The ring C that is secured to one pipe section A is disposed in sliding contact with the portions of the bore 14 of the fingers 10 of the other pipe section, thereby holding the pipe sections A from cocking or swinging into angular relation with respect to one another.

A flexible metallic tubular bellows D is disposed over the expansion joint area B, the bellows defining opposite end portions 16 which are arranged longitudinally beyond the area of the fingers 10. These end portions of the bellows are secured to the pipe sections A by any suitable means, such as soldering, brazing or welding 17, and providing a fluid-tight seal between the ends of the bellows and the pipe sections. It will be evident that the pipe sections constitute a guide which is disposed to contact with and hold the bellows D from buckling or squirming, when the pipe sections are moved toward and away from one another.

As suggested in Figure 1 of the drawings, the guide rings C are disposed to abut one another when the pipe sections A are moved a predetermined distance apart, but while the fingers 10 still remain in interdigitating relation.

Assuming that the various parts of my expansion compensator are arranged in the manner shown in Figure 1, it will be apparent that fluid flowing through the bores 14 of the pipe sections A will escape through the spaces 18 provided between adjacent fingers 10 and will enter the interior 19 of the bellows D. Subsequently, when the pipe sections A are moved toward one another, as shown in Figure 3, this fluid will return from the interior 19 of the bellows to the bores 14 through a plurality of bleed holes 20 fashioned in the walls 21 of the pipe sections. This will prevent the trapped fluid from bursting the bellows.

Pipes E may be attached to the outer ends 22 of the pipe sections A by any suitable coupling means, such as threaded sleeves 23. The bores 24 of the pipes E preferably corresponding in diameters with the bores 14 of the pipe sections A, thus allowing substantially unimpeded flow of fluid through the pipes E and the pipe sections A. The guide rings C may be made relatively thin so as not to disturb the flow of the fluid materially. Moreover, the guide ring C associated with each pipe section A will tie the fingers 10 thereof together, making a strong device, and the rings will serve as reinforcing members for the fingers.

The bellows D are protected from the inside throughout their length, except for the spaces 18 which are provided when the pipe sections A are moved apart. The fingers 10 themselves limit the movement of the pipe sections A toward one another, as suggested in Figure 3 of the drawings. In this view, the rings C are shown as providing closures over the spaces 18. It is obvious that the bellows D may be made from one or more thicknesses of metal, as is well known in the art.

Ordinarily, the pipes E are anchored at intervals along their lengths. However, particular attention is called to the fact that the inside guide rings C will act as stops and will prevent elongation of the bellows D and preclude over extending of the bellows, if the normal pipe line anchors should fail under pressure, which does happen.

Referring now to the second embodiment of my invention, as shown in Figures 4 to 6, inclusive, the pipe sections A, the bellows D, pipes E and threaded sleeves 23 are identical with those shown in the first embodiment. Accordingly, like reference characters have been applied to corresponding parts. However, the guide rings C' are modified so that they may be adjusted axially relative to the pipe sections A. As the specification continues, it will be apparent that the positions of the guide rings C' may be changed so that the stroke can be shorter or longer. Of course, it is possible to adjust these guide rings from the inside, and particularly in the larger size units where a person can reach in and re-position the guide rings C' to accommodate the travel required for a particular job.

For the purpose of permitting axial adjustment of the guide rings C' relative to the pipe sections A, these rings are fashioned with a series of inclined slots 25 therein. Set-screws 15' pass through these inclined slots from the interior of the rings C', and are threaded into the tip portions 12 of the fingers 10 (see Figure 5). When the set-screws 15' are loosened, the rings C' may be rotated partially, which will result in advancing or retracting the rings C' with respect to their respective pipe section A, as suggested by the dot-dash lines in Figure 6. Upon tightening the set-screws 15', the rings will be secured in place relative to the fingers 10. The adjustable rings C' would be mainly used when the customer desires to adjust in order to control the bellows moving into an extended position and to prevent over-stretch of the bellows, and likewise to guard against breakage in case adjacent pipe anchors give away.

The adjustable guide ring feature is intended to control the amount of extension of the bellows, which cannot always be determined by calculation in advance due to varying field conditions, and the advantage of the adjustable rings over the solid welded rings could be the advantage of making the proper adjustment after a field chill down test has been made.

As clearly shown in Figure 4, the slots 25 are inclined relative to the length of the fingers 10. In presenting the slotted adjustable rings C' I desire to point out the reason for the slots 25 being in angle position instead of being straight across the rings. The angle or inclined slots, when tightened in place, will carry a greater degree of resistance to the forces of end thrust than a straight slotted ring for the reason that you depend wholly on the tightness of the set-screws with the straight slotted ring; whereas, with the angularly slotted ring, one such screw 15' when properly tightened would normally hold the slotted ring C' in place, even though the other set-screws were not properly tightened. In other words, it is an added resistance to end loading due to the angle in which it opposes the thrust forces.

With particular reference to Figures 4 and 5, it will be noted that the side walls 11' of the fingers 10 are disposed non-radially. These angled walls present certain guiding and torque resisting advantages, since the fingers 10 through which the set-screws 15' extend overlap the intervening fingers, thus holding the interdigitating fingers 10 in mesh. It is obvious from Figure 5 that when the set-screws 15' are tightened, all of the fingers 10 will be drawn down against the guide rings C', but the pipe sections A still may move toward and away from one another. Alternate fingers 10 overlap intervening fingers 10 in Figure 5 to thus hold the fingers in meshing relation.

I claim:

1. In a bellows-type expansion compensator with anti-torque guide: a pair of pipe sections arranged in axial alignment with one another, and each being fashioned with a plurality of longitudinally extending fingers which are spaced circumferentially from one another; the fingers of each pipe section being arranged in interdigitating relation with the fingers of the other pipe section; the pipe sections being movable toward and away from each other in an axial direction to thereby provide an expansion joint area; a pair of guide rings, each being secured to the fingers of one of the pipe sections, and being disposed in sliding contact with the fingers of the other pipe section, thereby holding the pipe sections against swinging into axial angular relation with respect to one another; the rings reinforcing the fingers and holding the latter from flexing; and a flexible metallic tubular bellows disposed to extend longitudinally across the expansion joint area; the bellows defining opposite end portions which are arranged longitudinally beyond the area of the fingers; these end portions of the bellows being secured to the pipe sections in fluid tight relation therewith; the pipe sections being disposed to hold the bellows from bending and twisting, when the pipe sections are moved toward and away from one another; the fingers of one pipe section being arranged in sliding contact with the fingers of the other pipe section, whereby the pipe sections are precluded from rotating circumferentially relative to one another, thereby relieving the bellows of torque; the guide rings being disposed on their respective pipe sections so as to be movable toward one another when the pipe sections are moved away from one another in an axial direction; the guide rings being disposed to abut one another when the pipe sections are moved a predetermined distance apart in an axial direction, thus preventing further separation of the pipe sections, but while the fingers still remain in interdigitating relation; at least one of the guide rings being secured to the fingers of its respective pipe section for longitudinal adjustment relative thereto, whereby the axial movement of the pipe sections away from one another may be regulated.

2. In a bellows-type expansion compensator with anti-torque guide: a pair of pipe sections arranged in axial alignment with one another, and each being fashioned with a plurality of longitudinally extending fingers which are spaced circumferentially from one another; the fingers of each pipe section being arranged in interdigitating relation with the fingers of the other pipe section; the pipe sections being movable toward and away from each other in an axial direction to thereby provide an expansion joint area; a pair of guide rings, each being secured to the fingers of one of the pipe sections, and being disposed in sliding contact with the fingers of the other pipe section, thereby holding the pipe sections against swinging into axial angular relation with respect to one another; the rings reinforcing the fingers and holding the latter from flexing; and a flexible metallic tubular bellows disposed to extend longitudinally across the expansion joint area; the bellows defining opposite end portions which are arranged longitudinally beyond the area of the fingers; these end portions of the bellows being secured to the pipe sections in fluid-tight relation therewith; the pipe sections being disposed to hold the bellows from bending and twisting, when the pipe sections are moved toward and away from one another; the fingers of one pipe section being arranged in sliding contact with the fingers of the other pipe section, whereby the pipe sections are precluded from rotating circumferentially relative to one another, thereby relieving the bellows of torque; the guide rings being disposed on their respective pipe sections so as to be movable toward one another when the pipe sections are moved away from one another in an axial direction; the guide rings being disposed to abut one another when the pipe sections are moved a predetermined distance apart in an axial direction, thus preventing further separation of the pipe sections, but while the fingers still remain in interdigitating relation; the guide ring on at least one of said pipe sections being fashioned with a series of slots which are inclined with respect to the length of the fingers on said one pipe section; and a plurality of set screws anchored relative to the fingers on said one pipe section; each of these set screws extending through one of the slots; the guide ring on said one pipe section being adjustable in an axial direction, when said set screws are loosened and this guide ring is rotated circumferentially, whereby the axial movement of the pipe sections away from one another may be regulated.

3. In a bellows-type expansion compensator with anti-torque guide: a pair of pipe sections arranged in axial alignment with one another, and each being fashioned with a plurality of longitudinally extending fingers which are spaced circumferentially from one another; the fingers of each pipe section being arranged in interdigitating relation with the fingers of the other pipe section; the pipe sections being movable toward and away from each other in an axial direction to thereby provide an expansion joint area; a pair of guide rings, each being secured to the fingers of one of the pipe sections, and being disposed in sliding contact with the fingers of the other pipe section, thereby holding the pipe sections against swinging into axial angular relation with respect to one another; the rings reinforcing the fingers and holding the latter from flexing; and a flexible metallic tubular bellows disposed to extend longitudinally across the expansion joint area; the bellows defining opposite end portions which are arranged longitudinally beyond the area of the fingers; these end portions of the bellows being secured to the pipe sections in fluid-tight relation therewith; the pipe sections being disposed to hold the bellows from bending and twisting, when the pipe sections are moved toward and away from one another; the fingers of one pipe section being arranged in sliding contact with the fingers of the other pipe section, whereby the pipe sections are precluded from rotating circumferentially relative to one another, thereby relieving the bellows of torque; the guide rings being disposed on their respective pipe sections so as to be movable toward one another when the pipe sections are moved away from one another in an axial direction; each finger having a pair of side walls extending longitudinally thereof; said side walls being disposed non-radially relative to the axes of the pipe sections; these side walls of one pipe section dovetailing with and overlapping the adjacent side walls of the fingers of the other pipe section, thereby holding the fingers of the pipe sections in meshing relation as the pipe sections are moved toward and away from one another in an axial direction.

References Cited in the file of this patent
UNITED STATES PATENTS

| | | |
|---|---|---|
| 1,314,601 | McCaskey | Sept. 2, 1919 |
| 1,499,050 | Broome | June 24, 1924 |
| 2,116,290 | Spicer | May 3, 1938 |
| 2,348,833 | Miller | May 16, 1944 |
| 2,479,104 | Dreyer | Aug. 16, 1949 |
| 2,527,933 | Jakeway | Oct. 31, 1950 |
| 2,769,196 | Guilbert | Nov. 6, 1956 |